US 6,668,323 B1

(12) United States Patent
Challener et al.

(10) Patent No.: US 6,668,323 B1
(45) Date of Patent: Dec. 23, 2003

(54) METHOD AND SYSTEM FOR PASSWORD PROTECTION OF A DATA PROCESSING SYSTEM THAT PERMIT A USER-SELECTED PASSWORD TO BE RECOVERED

(75) Inventors: David Carroll Challener, Raleigh, NC (US); Mohammad Peyravian, Cary, NC (US); Russell Alan Resnick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/262,124

(22) Filed: Mar. 3, 1999

(51) Int. Cl.[7] .............................. H04L 9/00; G06F 11/30
(52) U.S. Cl. .................... 713/183; 713/202; 380/286
(58) Field of Search .............................. 713/183, 182, 713/202; 380/286

(56) References Cited

U.S. PATENT DOCUMENTS

| | | | |
|---|---|---|---|
| 4,759,062 A | | 7/1988 | Traub et al. |
| 4,951,249 A | | 8/1990 | McClung et al. |
| 5,091,939 A | | 2/1992 | Cole et al. |
| 5,226,080 A | | 7/1993 | Cole et al. |
| 5,402,492 A | * | 3/1995 | Goodman et al. ............ 713/202 |
| 5,436,972 A | * | 7/1995 | Fischer ........................ 380/286 |
| 5,535,409 A | | 7/1996 | Lavoire et al. |
| 5,699,514 A | | 12/1997 | Durinovic-Johri et al. |
| 5,708,777 A | | 1/1998 | Sloan et al. |
| 5,751,812 A | | 5/1998 | Anderson |
| 5,768,373 A | * | 6/1998 | Lohstroh et al. ............. 380/286 |
| 5,774,650 A | | 6/1998 | Chapman et al. |
| 5,781,793 A | | 7/1998 | Larvoire et al. |
| 5,787,169 A | * | 7/1998 | Eldridge et al. ............. 713/165 |
| 5,818,936 A | | 10/1998 | Mashayekhi |
| 5,818,939 A | | 10/1998 | Davis |
| 5,841,970 A | | 11/1998 | Tabuki |
| 5,850,443 A | | 12/1998 | Van Oorschot et al. |
| 5,870,470 A | | 2/1999 | Johnson et al. |
| 5,881,226 A | | 3/1999 | Veneklase |
| 5,887,131 A | | 3/1999 | Angelo |
| 5,892,906 A | | 4/1999 | Chou et al. |
| 6,079,021 A | | 6/2000 | Abadi et al. |
| 6,141,760 A | | 10/2000 | Abadi et al. |

FOREIGN PATENT DOCUMENTS

| | | |
|---|---|---|
| JP | 63040963 A | 2/1988 |
| JP | 7129511 A | 5/1995 |

* cited by examiner

Primary Examiner—Gilberto Barrón
Assistant Examiner—Courtney D. Fields
(74) Attorney, Agent, or Firm—Carlos Munoz-Bustamante; Bracewell & Patterson, LLP

(57) ABSTRACT

A data processing system-based password protection system protects a resource with an access password that may be user selected. The access password and an encryption key unique to the resource are stored in non-volatile storage at a data processing system, where the encryption key is at least partially derived from unique information associated with the resource. In response to receipt of an attempted access password at the data processing system, access to the resource is permitted if the attempted access password matches the stored access password. However, in response to an indication that the access password has been forgotten, an encrypted access password generated at the data processing system from the stored access password utilizing the encryption key is output from the data processing system. The access password can thereafter be recovered from the encrypted access password and the unique information.

20 Claims, 4 Drawing Sheets

METHOD AND SYSTEM FOR PASSWORD PROTECTION OF A DATA PROCESSING SYSTEM THAT PERMIT A USER-SELECTED PASSWORD TO BE RECOVERED

CROSS-REFERENCE TO RELATED APPLICATION

The present patent application is related to application U.S. Ser. No. 09/052,554 now U.S. Pat. No. 6,970,454 filed on Mar. 31, 1998, entitled "Method and Apparatus For Establishing Computer Configuration Protection Passwords for Protecting Computer Configurations," which is incorporated herein by reference.

BACKGROUND OF THE INVENTION

1. Technical Field

The present invention relates in general to data processing and in particular to password protection of data processing systems. Still more particularly, the present invention relates to a method and system for password protection of a data processing system that permit a user-selected password to be recovered.

2. Description of the Related Art

Password protection is commonly utilized to control access to individual computer systems, computer networks, and other data processing resources. Each time a user desires to obtain access to a password protected resource, the user must enter a password. If the password entered by the user is valid, the user is permitted to access the password protected resource; if the entered password is invalid, no access is granted.

The security of protected data processing resources can be enhanced by increasing password complexity, which may entail, for example, enforcing a minimum password length, requiring the user to enter multiple passwords (e.g., a pass phrase), or requiring case-sensitive passwords or passwords containing both letters and numbers. Security is even further enhanced by limiting the duration of password validity. Thus, in very secure systems, passwords may be valid for only a single day or even a single access.

When administering a large collection of data processing resources such as an enterprise, a significant amount of the administrative cost is attributable to implementation of a password protection policy. Because the administrative burden of generating and distributing passwords from a central location to a large number of users is prohibitive, particularly when the passwords have limited durations of validity, it is preferred for users to be able to select and set their own passwords. In addition to lowering the administrative burden, user selection of passwords (as opposed to central assignment) has the additional benefit of increasing the likelihood is that a user will remember his password.

The ability of a user to remember his password(s) is a key concern in systems in which passwords are user-selected. It is highly desirable from a security standpoint that users refrain from writing down or so otherwise recording their passwords. However, relying on users to memorize their passwords requires that some mechanism be available that permits authorized access to a data processing resource protected by a user-selected password in the event that a user forgets his password.

SUMMARY OF THE INVENTION

The present invention satisfies the need to permit authorized access to a data processing resource protected by a user-selected password in the event that a user has forgotten the password by enabling the recovery of the password from an encrypted version of the password stored by the protected data processing system resource.

In accordance with the present invention, an access password and an encryption key unique to a protected resource are stored in non-volatile storage at a data processing system, where the encryption key is at least partially derived from unique information associated with the protected resource. In response to receipt of an attempted access password at the data processing system, access to the resource is permitted if the attempted access password matches the stored access password. However, in response to an indication that the access password has been forgotten, an encrypted access password generated at the data processing system from the stored access password utilizing the encryption key is output from the data processing system. The access password can thereafter be recovered from the encrypted access password and the unique information.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
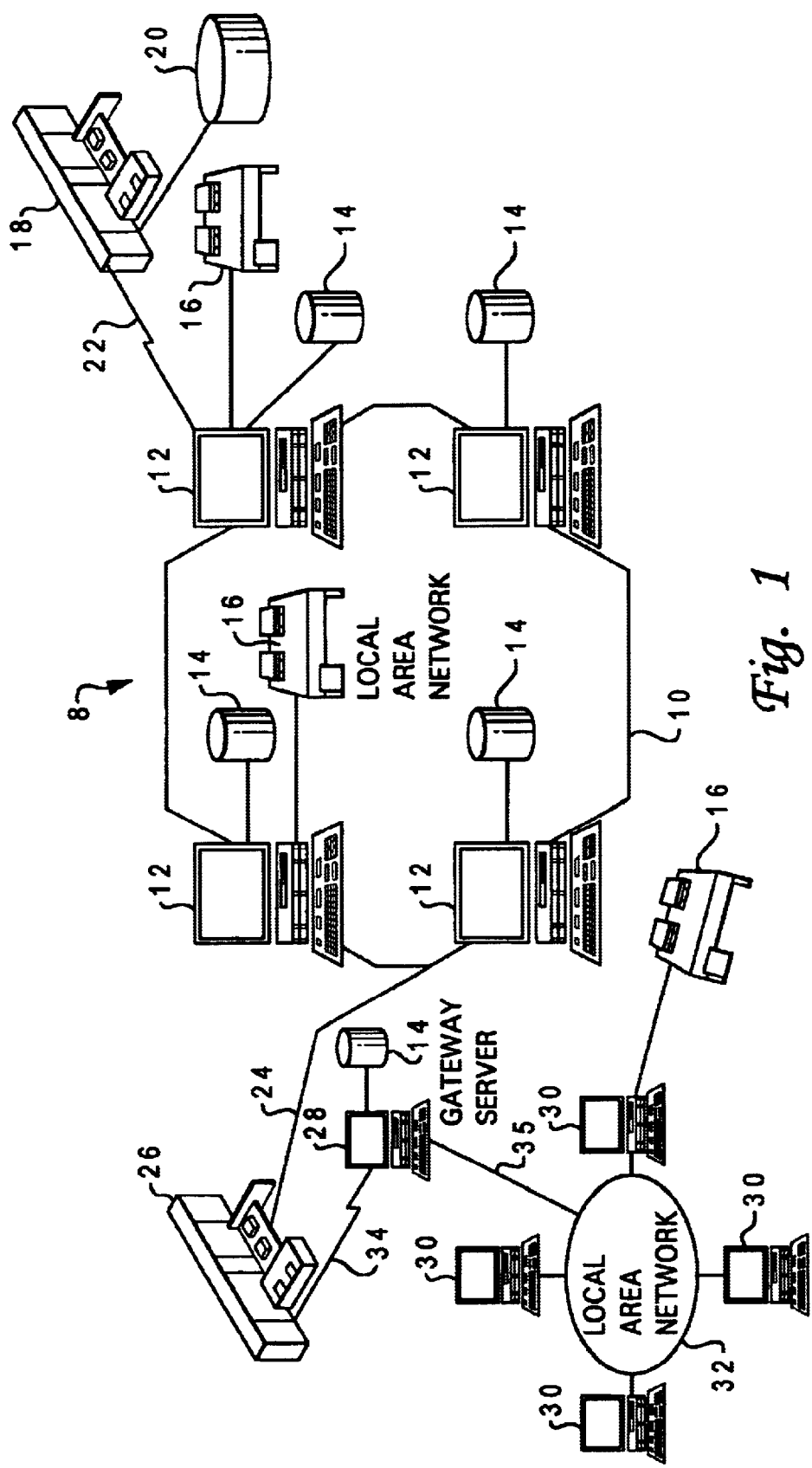
FIG. 1 depicts an enterprise computing environment with which the present invention may advantageously be utilized.

With reference now to the figures and in particular with reference to FIG. 1, there is illustrated an enterprise computing environment 8 with which the present invention may advantageously be utilized. As illustrated, enterprise computing environment 8, which may represent networked computers at a corporate campus (or campuses), contains a plurality of networks, including local area networks (LANs) 10 and 32, which each include a number of individual computer systems 12 and 30, respectively. Those skilled in the art will appreciate that networks 10 and 32 may alternatively or additionally include a plurality of workstations coupled to a host processor. As is common in such data processing networks, each computer system 12 and 30 may have a storage device 14 and a printer 16.

Enterprise computing environment 8 further includes one or more mainframe computers, such as mainframe computer 18, which are coupled to LAN 10 by means of a communication link 22. Mainframe computer 18 is coupled to a storage device 20 serving as remote storage for LAN 10. LAN 10 is also coupled via communications link 24, communications controller 26, and communications link 34 to gateway server 28. Gateway server 28 is in turn linked to LAN 32 by communications link 35. As will be understood by those skilled in the art, enterprise computing environment 8 additionally includes unillustrated gateways, routers, bridges, and various other network hardware utilized to interconnect the various segments of enterprise computing environment 8.

In order to restrict access to the various resources of enterprise computing environment 8 described above to only authorized users, each entry point into enterprise computing environment 8 is preferably password protected. That is, in a preferred embodiment, a user must enter at least a power-on password (POP) to logon to one of computers 12, 30, 28 and 26. Additional passwords or pass phrases may be required for the user to obtain access to additional resources of enterprise computing environment 8.

Figure 2:
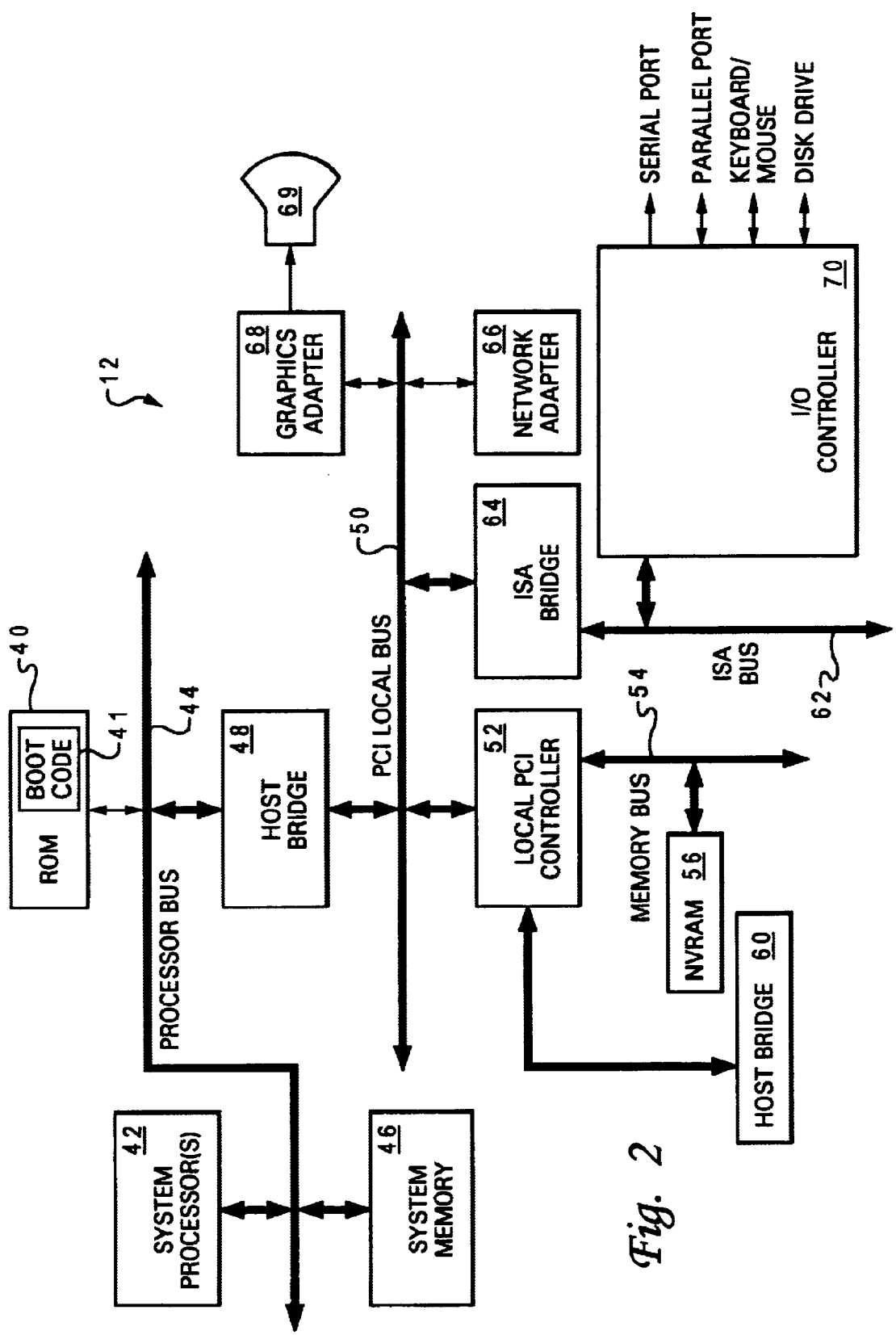
FIG. 2 illustrates a block diagram of a password-protected computer system in accordance with the present invention.

Referring now to FIG. 2, there is depicted a block diagram of an illustrative embodiment of a computer system 12 within enterprise computing environment 8. The illustrative embodiment depicted in FIG. 2 may be a desktop computer system, such as one of the Aptiva® series of personal computers, or a workstation computer, such as the RS/6000®, which are both manufactured by International Business Machines (IBM) Corporation of Armonk, N.Y.; however, as will become apparent from the following description, the present invention is applicable to the protection of a resource by any data processing system.

As shown in FIG. 2, computer system 12 includes at least one system processor 42, which is coupled to a Read-Only Memory (ROM) 40 and a system memory 46 by a processor bus 44. System processor 42, which may comprise one of the PowerPC™ line of processors produced by IBM Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/0) controller 70, which controls communication between computer system 12 and attached peripheral devices such as a keyboard, mouse, and disk drive (e.g., storage 14). In addition, I/O controller 70 supports external communication by computer system 12 via serial and parallel ports.

Figures 3, 5:
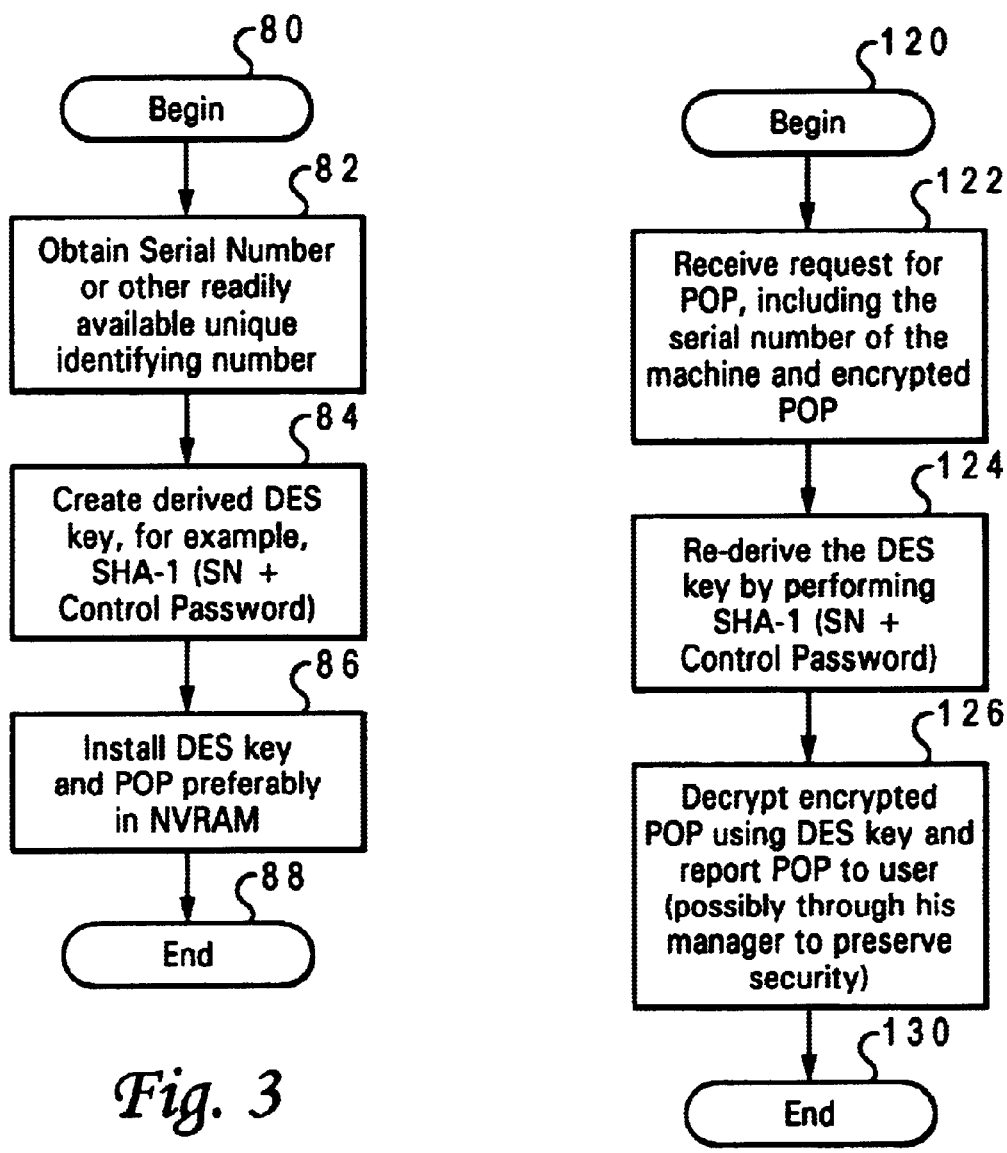
FIG. 3 is a high level logical flowchart of an exemplary method of initializing a password-protected computer system in accordance with the present invention.
FIG. 5 is a high level logical flowchart of an exemplary method of recovering a user-selected password in accordance with the present invention.

With reference now to FIG. 3, there is illustrated a high level logical flowchart of a method of initializing a password-protected computer system, such as computer system 12 of FIG. 2, in accordance with the present invention. As shown, the process begins at block 80 and thereafter proceeds to block 82, which depicts an enterprise administrator obtaining the serial number or other readily available information that uniquely (or relatively uniquely) identifies the data processing resource to be password protected. Next, at block 84 a Data Encryption Standard (DES) key is derived from a selected control password (or pass phrase) and the serial number or other identifying information of the resource to be protected. In a preferred embodiment, the DES key is derived by concatenating the serial number and the control password and then hashing the resulting string with a non-reversible hashing algorithm such as SHA-1. As well-known to those skilled in the art, the SHA-1hashing algorithm always yields a 64-bit output string that is the same for identical inputs. As shown at block 86, the DES key derived at block 84 is then installed in non-volatile storage within computer system 12, for example, together with other configuration information contained in NVRAM 56. In addition, an initial power-on password (POP) for the user is also stored within NVRAM 56 or other non-volatile storage. The user's POP can be changed by the user at any time utilizing a conventional password resetting routine. Once the POP is changed by the user, enterprise administration has no knowledge of the user's POP.

Figure 4:
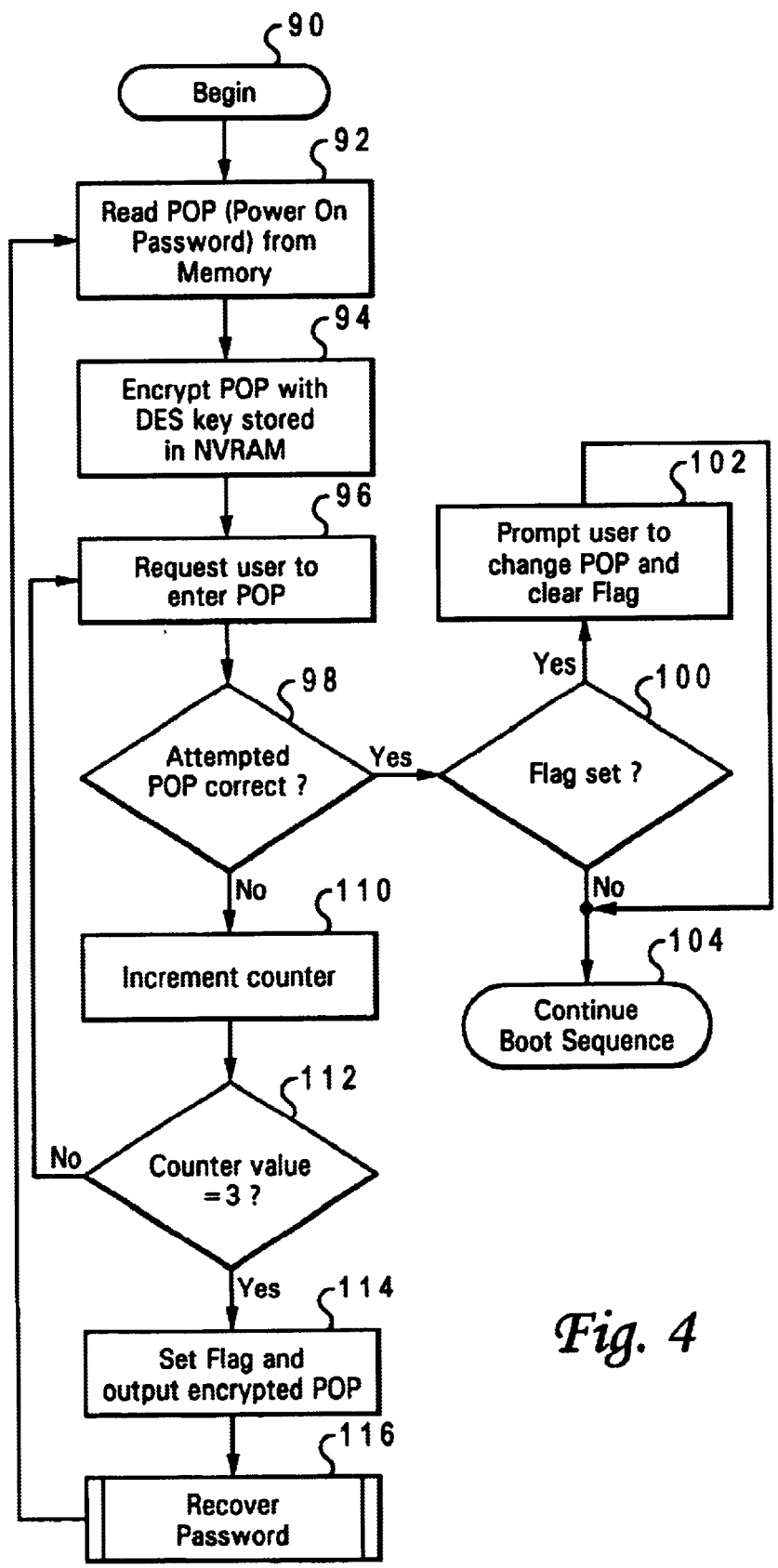
FIG. 4 is a high level logical flowchart of an exemplary method of enforcing password protection of a computer system at power-on in accordance with the present invention.

Referring now to FIG. 4, there is depicted a high level logical flowchart of an exemplary method of enforcing power-on password protection for a computer system, such as computer system 12, in accordance with the present invention. The process shown in FIG. 4 can be implemented, for example, by boot code 41 within ROM 40.

As illustrated, the process begins at block 90 in response to a user powering on computer system 12 to begin the boot sequence. After computer system 12 has achieved a known stable state, for example, through the execution of Power-On Self-Test (POST) and Basic Input/Output System (BIOS) code, computer system 12 reads the POP from NVRAM 56, as shown at block 92, and encrypts the POP with the DES key stored in NVRAM 56, as illustrated at block 94. Computer system 12 then prompts the user to enter the POP, for example, through the display of a dialog box within display 69, as depicted at block 96.

If the user correctly enters the POP for computer system 12, that is, the attempted POP entered by the user matches the stored POP, the process passes through block 98 to block 100, which depicts computer system 12 determining if a password change flag is set. The password change flag can be set to enforce a selected password validity duration or to maintain security following recovery of a forgotten user-selected password, as described below. If the password change flag is not set, computer system 12 continues the boot sequence at block 104. As a result, the user is thereafter permitted access to computer system 12, and depending upon implementation, additional data processing resources, such as LAN 10, remote storage 20, etc. If, however, a determination is made at block 100 that the password change flag is set, the user is prompted to change the POP at block 102. Following the update to the POP, the password change flag is cleared, and the boot sequence continues at block 104.

Referring again to block 98, if the attempted POP entered by the user is incorrect, the process passes to blocks 110 and 112, which illustrate computer system 12 incrementing a counter and determining by reference to the counter whether or not the user has incorrectly entered the POP three times. If not, the process returns to block 96, which has been described. If, however, the user has failed to correctly enter the POP three times, computer system 12 exits the boot sequence, and the process passes to blocks 114 and 116. In this manner, computer system 12 does not exit the boot sequence in response to the user merely mistyping the POP a single time, but only exits the boot sequence if it appears that the user has forgotten the POP.

Blocks 114 and 116 illustrate computer system 12 outputting the encrypted POP obtained at block 94 and then initiating recovery of the user-selected POP from the encrypted POP at block 116. Following recovery of the user-selected POP, the process returns to block 92, which has been described.

In accordance with the present invention, the output and password recovery operations illustrated at blocks 114 and 116 of FIG. 4 can be performed either automatically by data processing systems within enterprise computing environment 8 and/or with human intervention. If the password recovery operation is implemented with human intervention, the encrypted POP is preferably output by computer system 12 by displaying the encrypted password within display 69. The password recovery operation illustrated at block 116 (and depicted in greater detail in FIG. 5) is then initiated, for example, by telephoning the help desk administering enterprise computing environment 8.

With reference now to FIG. 5, there is illustrated a high level logical flowchart of an exemplary method of recovering a user-selected password in accordance with the present invention. As shown, the process begins at block 120 and thereafter proceeds to block 122, which depicts the help desk of enterprise computing environment 8 receiving the user's request for the POP of computer system 12 together with the serial number of computer system 12 and the encrypted POP output at block 114 of FIG. 4. As illustrated at block 124 of FIG. 5, the human operator at the help desk then enters the serial number reported by the user into a data processing system, which, utilizing the SHA-1hashing algorithm, again derives the DES key used to encrypt the POP from the known control password or pass phrase and the serial number. Then, at block 126, the data processing system decrypts the encrypted POP supplied by the user using the DES key. Once the user-selected POP has been recovered in this manner, the help desk operator can provide the POP (which was heretofore known only to the user) to the user, preferably through the user's manager, via telephone, or by other means by which the identity of the person requesting the POP can be verified. Thus, the security concern at this point is not chiefly over interception of the POP, which will be changed upon logon at block 102 of FIG. 4, but rather that the person requesting recovery of the POP is an authorized user of computer system 12. Following block 126, the password recovery operation shown in FIG. 5 terminates at block 130, and the process shown in FIG. 4 returns to block 92.

As noted above, it should be understood that the password recovery operation depicted at blocks 114 and 116 of FIG. 4 and in FIG. 5 can alternatively be performed automatically and without the intervention of a human help desk operator. For example, at block 114 the encrypted POP could automatically be transmitted from computer system 12 via LAN 10 to a secure computer system within enterprise computing environment 8. The secure computer system would then decrypt the encrypted POP as depicted in FIG. 5 and supply the POP to the user in response to some verification of the user's identity, for example, mother's maiden name, retinal scan, fingerprint matching, etc.

As has been described, the present invention provides an improved method and system for implementing password protection for a data processing resource such as a computer system. According to the present invention, an access password and an encryption key unique to the data processing resource to be protected are stored in non-volatile storage within a data processing system. The encryption key is at least partially derived from unique information, such as a serial number, that is associated with the protected resource. If the user of the protected resource has forgotten the access password, an encrypted access password generated utilizing the encryption key is output from the data processing system. From this encrypted access password and the unique information, the access password can then be recovered.

The present invention has the advantage of permitting a user-selected password that has been forgotten by the user and is unknown to network administration to be easily recovered without resorting to teardown of the data processing system. In addition, because the encryption key is derived from information unique to the protected resource, interception and cracking of an encrypted password does not compromise the security of other password protected resources within the enterprise.

While the invention has been particularly shown and described with reference to an illustrative embodiment, it will be understood by those skilled in the art that various changes in form and detail may be made therein without departing from the spirit and scope of the invention. For example, although aspects of the present invention have been described with respect to one or more computer systems executing software that directs the functions of the present invention, it should be understood that present invention may alternatively be implemented as a computer program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A method within a data processing system for providing password protection for a resource protected by a password that may be user selected, said method comprising:

storing an access password and an encryption key unique to said resource in non-volatile storage at a data processing system, wherein said encryption key is at least partially derived from unique information associated with said resource;

in response to receipt of an attempted access password at said data processing system, allowing access to said resource if said attempted access password matches said stored access password;

in response to an indication that said access password has been forgotten, outputting an encrypted access password generated at said data processing system from said stored access password utilizing said encryption key; and thereafter, recovering said access password from said encrypted access password and said unique information.

2. The method of claim 1, and further comprising deriving said encryption key from a control password and said unique information utilizing a non-reversible hashing algorithm.

3. The method of claim 2, wherein recovering said password comprises:
   again deriving said encryption key from said control password and said unique information; and
   decrypting said encrypted access password provided by said data processing system to recover said access password.

4. The method of claim 1, wherein said unique information is a serial number of said data processing system.

5. The method of claim 1, wherein said data processing system is a first data processing system, and wherein said step of outputting an encrypted access password comprises outputting said encrypted access password to a second data processing system utilized to recover said access password.

6. The method of claim 1, and further comprising:
   in response to entry of said recovered access password into said data processing system, requiring a user to change said access password stored within said non-volatile storage.

7. A password protection system for a resource, said password protection system comprising:
   a data processing system that protects access to said resource by requiring entry of an access password to obtain access to said resource, said data processing system including non-volatile storage that stores an access password and an encryption key unique to said resource, wherein said encryption key is at least partially derived from unique information associated with said resource, and wherein said data processing system outputs an encrypted access password generated at said data processing system from said stored access password utilizing said encryption key in response to an indication that said access password has been forgotten, such that said access password can be recovered from said encrypted access password and said unique information without advance knowledge of said access password.

8. The password protection system of claim 7, wherein said encryption key is derived from a control password and said unique information utilizing a non-reversible hashing algorithm.

9. The password protection system of claim 8, wherein said data processing system is a first data processing system, said password protection system further comprises a second data processing system that again derives said encryption key from said control password and said unique information and utilizes said encryption key to decrypt said encrypted access password output by said first data processing system, such that said access password is recovered.

10. The password protection system of claim 7, wherein said unique information is a serial number of said data processing system.

11. The password protection system of claim 7, wherein said data processing system requires a user to change said access password stored within said non-volatile storage in response to entry of said recovered access password into said data processing system.

12. A program product, comprising:
   a data processing system usable medium; and
   password protection software, embodied within said data processing system usable medium, that protects access to a resource by requiring entry of an access password into a data processing system to obtain access to said resource, wherein said password protection program derives an encryption key unique to said resource at least partially from unique information associated with said resource, said password protection program outputting an encrypted access password generated utilizing said encryption key in response to an indication that said access password has been forgotten, such that said access password can be recovered from said encrypted access password and said unique information without advance knowledge of said access password.

13. The program product of claim 12, wherein said password protection software derives said encryption key from a control password and said unique information utilizing a non-reversible hashing algorithm.

14. The program product of claim 13, said password protection software further comprising password recovery software that again derives said encryption key from said control password and said unique information and utilizes said encryption key to decrypt said encrypted access password output by said first data processing system, such that said access password is recovered.

15. The program product of claim 12, wherein said unique information is a serial number of said data processing system.

16. The program product of claim 12, wherein password protection software requires a user to change said access password in response to entry of a recovered access password into said data processing system.

17. The method of claim 5, wherein said steps of storing and allowing access are performed by said first data processing system.

18. The method of claim 17, wherein said step of allowing access comprises allowing access in response to user entry of said access password.

19. The password protection system of claim 7, wherein said data processing system allows access to said response in response to user entry of said access password.

20. The program product of claim 12, wherein said password protection software allows access to said response in response to user entry of said access password.

* * * * *